United States Patent Office 2,712,181
Patented July 5, 1955

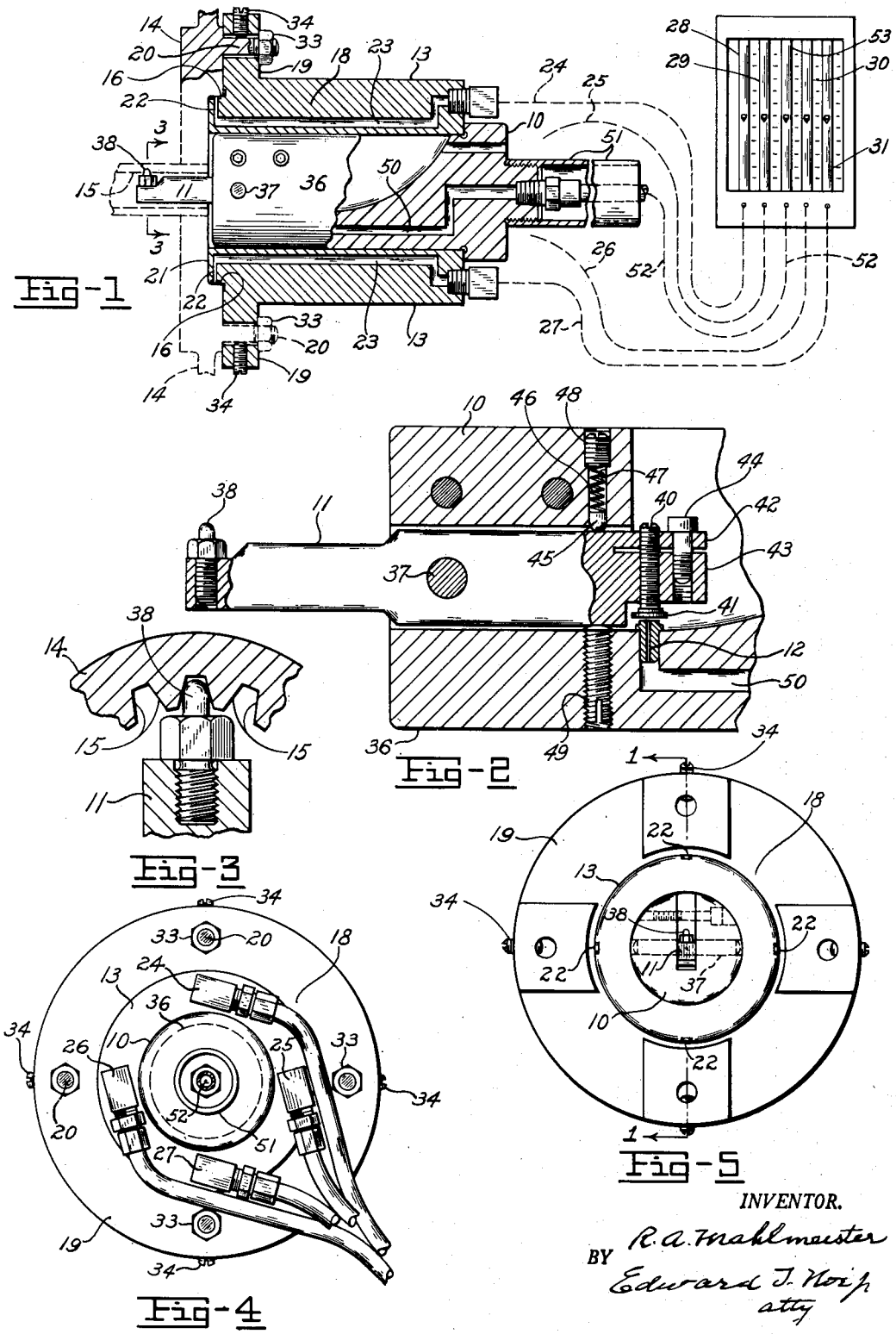

2,712,181

PNEUMATIC CONCENTRICITY GAUGE

Raymond A. Mahlmeister, Dayton, Ohio, assignor to The Sheffield Corporation, Dayton, Ohio, a corporation of Ohio Application May 19, 1951, Serial No. 227,138

5 Claims. (Cl. 33—181)

This invention relates to gauging apparatus and more particularly to apparatus for checking the concentricity of annular surfaces.

One object of the invention is the provision of a gauging apparatus including a gauging spindle having movable work engaging means positioned by the work, the spindle being held and guided by a housing which is adapted for accurate positioning on the part to be gauged so that concentricity of different surfaces can be checked.

Another object is the provision of a gauging apparatus of the character mentioned in which the spindle housing carries the gauging spindle for rotational and axial movements thereon and in which the concentricity check is effected by means of air jets controlled by the surfaces on the part to be checked.

Another object is the provision of a concentricity gauge having a movable work contacting finger controlling an air jet, the finger adapted for entering the grooves of a serrated or splined surface, the spindle being guided by a housing having spaced air jets for discharging air against an annular surface on the part and having means for accurately centering the housing with respect to said annular surface.

Other objects and advantages will be apparent from the following description, the appended claims and the accompanying drawing, in which Fig. 1 is a longitudinal sectional view on line 1—1 of Fig. 5, of a gauging device embodying the present invention and illustrating its connection to flow indicating devices;

Fig. 2 is an enlarged longitudinal sectional view through the end of the gauging spindle;

Fig. 3 is an enlarged transverse fragmentary section on the line 3—3 of Fig. 1;

Fig. 4 is a view showing the rear end of the gauging device; and

Fig. 5 is an elevational view showing the front end of the gauging device.

The gauging device as herein shown essentially comprises a gauging spindle 10 having a work contacting finger 11 which controls an air jet nozzle 12, the spindle 10 being guided by and carried in a housing 13 which is adapted to be secured to a part 14 to be gauged. In accordance with the present invention, the device is particularly applicable for gauging the concentricity of a serrated or splined surface 15 with respect to an annular surface 16 on the part 14. This part 14 may, for example, be the end of a power transmission or any other part wherein it is required that a concentricity relation be maintained between an annular surface and another surface.

The housing 13 includes a body portion 18 and an end flange 19 that is provided with a series of spaced holes. These holes are adapted to receive spaced locating studs 20 on the part 14, with sufficient play to permit substantial adjusting movement of the housing in a direction transverse of the housing axis. At the end of the body member 18 is a projection 21 having a series, preferably four in number, of air jets or nozzles 22 arranged to discharge air radially and against the annular surface 16, the ends of the nozzles being slightly spaced away from the surface 16. These nozzles, as shown in Fig. 5 are positioned in opposed relationship and spaced 90 degrees apart with each nozzle in communication with an air passage 23 extending longitudinally of the body member. The four passages 23 thus provided are individually connected to fluid conduits 24, 25, 26 and 27 which extend to four indicating devices 28, 29, 30 and 31 respectively. Each of these indicating devices is preferably an upwardly flaring transparent tube containing a float that positions itself in accordance with the amount of air flow through the tube. The upper ends of the tubes 28 to 31 are connected to conduits 24 to 27 and the lower end of the tubes is supplied with air under regulated pressure. The levels of the floats indicate the rate of air flow through the tubes. The four tubes are of similar construction and normally the four floats position themselves at the same level or opposite one another when the same spacings exist between the nozzles 22 and the annular surface 16.

The housing 13 may be positioned against the end face of the part 14 and the nuts 33 brought up against the flange 19. The float levels are then noted and if they are not all at the same height, the housing is centered with respect to the annular surface 16 by adjusting the four centering screws 34 which engage the studs 20 and take up radial play. These centering screws are manipulated until the floats in the indicating devices are at the same level and then nuts 33 are tightened. Under these conditions the housing 13 will be exactly centered with respect to the surface 16 on the part to be gauged.

Having centered the housing, the operator inserts the gauging spindle 10. The body portion 36 of this spindle is of cylindrical shape having a close operating fit in a cylindrical bore in the housing, the spindle being held for rotational as well as axial movement in the housing. The finger 11 is pivotably carried on a pivot pin 37 and carries a feeler element 38 that is adapted to contact the inside of the hole or passage to be explored, this passage as shown here being a splined surface 15. The feeler element 38 may be rounded and of such size as to engage the pitch line of the spline. The other end of the finger 11 has an adjustable stud 40 threaded therein, the head 41 of this stud being flat and serving to control the amount of air flowing out through the nozzle 12 from which it is slightly spaced in operation. The rear end of the finger is split to provide two integral spaced portions 42 and 43 and the stud 40 is held after it is adjusted by tightening a locking bolt 44 threaded in the portion 43. A spring 46 is located in a bore 47 in the spindle and engages a threaded retaining screw 48 at one end and presses at its other end against a pressure member 45 which engages the finger and serves to normally hold the element 38 raised slightly above the position to which it is depressed by the work in the gauging operation. A stop screw 49 limits the clockwise movement of the finger 11 on the spindle as viewed in Fig. 2 and serves to normally space the flat end of the stud 40 away from the nozzle 12 so that some small flow takes place through the nozzle under all conditions. The nozzle 12 is in communication with a supply passage 50 which extends through handle 51 and leads to a conduit 52 connected to the indicating tube 53. The height of the float in the indicating tube 53 varies in accordance with changes in spacing between the end of the stud 40 and the nozzle 12.

It will thus be apparent that as the spindle is moved axially into engagement with the splined surface 15, the exploring end of the finger will be depressed slightly when the finger first engages the splines and an observation of the float level in the tube 53 can then be made. As the spindle is advanced further into the work the operator notes the float level and sees whether it changes. If it does change, it will indicate that the splined surface is either tapered or is not concentric with respect to the annular surface 16. The operator may then pull back the spindle to disengage the spindle from that spline and turn the spindle about its own axis. Suppose the rotational movements thus effected are 180 degrees and the spindle is again inserted. If the float level 53 is the same as it was in the first gauging step the operator will know that the splined surface is centered with the annular surface 16 on the part. In the same manner, if desired, the operator can explore each individual groove of the spline and determine the relationship of the spline throughout its various portions by noting the level of the float in the tube 53.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. Gauging apparatus of the character described comprising a gauging spindle having a movable work contacting finger, an air jet on said spindle controlled by said finger, indicating means operable in accordance with the amount of air flow through said jet, a spindle housing slidably guiding said spindle for axial movement therein, means for connecting the housing to a part to be gauged, means for centering the housing with respect to an annular surface on the part to be gauged and including spaced air jets positioned in the housing to discharge air against said annular surface, and indicating means controlled by said spaced air jets.

2. Gauging apparatus of the character described for gauging a part having different surfaces one of which is an annular surface and one of which is a surface to be gauged, comprising a gauging spindle, a work contacting finger pivotably carred by said spindle for engaging the surface to be gauged, an air jet in said spindle controlled by said finger to vary the flow through the air jet in accordance with the position of the finger, indicating means operable in accordance with air flow through said jet, a spindle housing slidably guiding said spindle for axial and rotational movement therein, means for positively fixing the housing to the part to be gauged, and means for centering the housing with respect to the annular surface on the part.

3. Gauging apparatus of the character described comprising a gauging spindle, a work contacting finger pivotably carried by said spindle, an air jet in said spindle controlled by said finger to vary the flow through the air jet in accordance with the position of the finger, indicating means operable in accordance with air flow through said jet, a spindle housing slidably guiding said spindle for axial and rotational movement therein, means for connecting the housing to a part to be gauged, and means for centering the housing with respect to an annular surface on the part to be gauged including spaced air jets positioned in the housing to discharge air against said annular surface and indicating means controlled by said spaced air jets.

4. Gauging apparatus of the character described for gauging the concentricity of a serrated or splined opening with respect to an annular surface on a part to be gauged, comprising a gauging spindle having a movable work contacting finger, an air jet on said spindle controlled by said finger, indicating means operable in accordance with air flow through said jet, a spindle housing slidably guiding said spindle for axial and rotational movement therein, means for positively fixing said housing to the part to be gauged, and means for centering the housing with respect to said annular surface on the part to be gauged.

5. Gauging apparatus of the character described for gauging the concentricity of serrated or splined opening with respect to an annular surface on a part to be gauged, comprising a gauging spindle having a movable work contacting finger, an air jet on said spindle controlled by said finger, indicating means operable in accordance with air flow through said jet, a spindle housing slidably guiding said spindle for axial and rotational movement therein, means for connecting said housing to the part to be gauged, means for centering the housing with respect to said annular surface on the part to be gauged and including spaced air jets positioned in the housing to discharge air at spaced points against said annular surface, and indicating means individually controlled by said spaced air jets.

References Cited in the file of this patent

UNITED STATES PATENTS

| 2,241,401 | Haskell | May 13, 1941 |
| 2,465,002 | Aller | Mar. 22, 1949 |
| 2,490,376 | Rupley | Dec. 6, 1949 |
| 2,573,843 | Hendrix | Nov. 6, 1951 |
| 2,623,294 | Fox | Dec. 30, 1952 |

FOREIGN PATENTS

| 546,900 | Great Britain | Aug. 4, 1942 |